(12) United States Patent
Dokic

(10) Patent No.: US 11,753,842 B2
(45) Date of Patent: Sep. 12, 2023

(54) TOWER OF A WIND TURBINE

(71) Applicant: Siemens Gamesa Renewable Energy A/S, Brande (DK)

(72) Inventor: Adnan Dokic, Kolding (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 37 days.

(21) Appl. No.: 17/342,958

(22) Filed: Jun. 9, 2021

(65) Prior Publication Data

US 2021/0396032 A1    Dec. 23, 2021

(30) Foreign Application Priority Data

Jun. 17, 2020   (EP) ................................. 20180474

(51) Int. Cl.
| | |
|---|---|
| *E04H 12/00* | (2006.01) |
| *F03D 13/20* | (2016.01) |
| *E04H 12/08* | (2006.01) |
| *E06B 3/46* | (2006.01) |
| *E05D 15/06* | (2006.01) |
| *E06B 3/70* | (2006.01) |
| *E06B 7/16* | (2006.01) |
| *E06B 3/263* | (2006.01) |

(52) U.S. Cl.
CPC ............ *E04H 12/003* (2013.01); *E04H 12/08* (2013.01); *E05D 15/0626* (2013.01); *E06B 3/26347* (2013.01); *E06B 3/46* (2013.01); *E06B 3/7007* (2013.01); *E06B 7/16* (2013.01); *F03D 13/20* (2016.05)

(58) Field of Classification Search
CPC ...... E06B 3/46; E06B 3/4636; E06B 3/26347; E06B 7/16; E04H 12/003; E04H 12/08; F03D 13/20; Y02E 10/727; E05D 15/0626
See application file for complete search history.

(56) References Cited

U.S. PATENT DOCUMENTS

| | | | | |
|---|---|---|---|---|
| 1,112,203 A | * | 9/1914 | Fandrey | F03D 80/70 415/125 |
| 8,887,444 B2 | * | 11/2014 | Kalempa | E06B 7/2309 49/501 |
| 2002/0017060 A1 | * | 2/2002 | Kern | F25D 23/021 49/231 |
| 2020/0165862 A1 | * | 5/2020 | Cohen | E06B 3/26301 |

(Continued)

FOREIGN PATENT DOCUMENTS

| | | |
|---|---|---|
| CN | 206290376 U | 6/2017 |
| CN | 206309530 U | 7/2017 |

(Continued)

OTHER PUBLICATIONS

European Search Report dated Nov. 13, 2020 for application No. 20180474.7.

*Primary Examiner* — Andrew J Triggs
(74) *Attorney, Agent, or Firm* — Schmeiser, Olsen & Watts LLP

(57) ABSTRACT

Provided is a tower of a wind turbine, having a hollow inner space and a door for opening and closing an aperture into the inner space, wherein the door is a sliding door, which is slidingly arranged on a tower aperture member attached to the tower, and which sliding door is at least partially sealed by a seal to the tower aperture member at least when the door is in the closed position.

14 Claims, 4 Drawing Sheets

(56) References Cited

U.S. PATENT DOCUMENTS

2021/0396032 A1* 12/2021 Dokic .................. E04H 12/003
2021/0404246 A1* 12/2021 Lee ........................ E05D 15/06

FOREIGN PATENT DOCUMENTS

| EP | 1152114 A1 | | 11/2001 | | |
|----|------------|---|---------|---|---|
| KR | 20100040086 A | | 4/2010 | | |
| KR | 20140025721 A | * | 3/2014 | ............ | F03D 13/20 |
| KR | 20140025721 B1 | | 9/2019 | | |
| WO | 2019096360 A1 | | 5/2019 | | |

* cited by examiner

TOWER OF A WIND TURBINE

CROSS-REFERENCE TO RELATED APPLICATIONS

This application claims priority to EP Application No. 20180474.7, having a filing date of Jun. 17, 2020, the entire contents of which are hereby incorporated by reference.

FIELD OF TECHNOLOGY

The following relates to a tower of a wind turbine, having a hollow inner space and a door for opening and closing an aperture into the inner space.

BACKGROUND

Wind turbines are commonly known. They comprise a tower, on which a nacelle is arranged, comprising a rotatable hub with several blades, which, when the wind blows, make the hub rotate. The hub is coupled to a generator for producing electric energy.

The tower is usually a hollow, elongated construction based on the ground. Within the tower an inner space is given, in which for example a lift is arranged for transporting persons or goods from the bottom to the nacelle and vice versa.

For entering the inner of the tower an aperture is provided in the tower, which can be opened and closed by a door. The door is hinged to a door plate, which is attached to a door frame arranged at the tower and firmly fixed to the tower or embedded into the concrete the tower is usually made of. The size of the door itself is restricted to a given maximum size in order to cope with the wind pressure, as, when the wind pressure is high, the door can't be opened or closed, if it is too large. Therefore, when larger components need to be transported into and out of the inner space, it is necessary to dismantle the door and the door plate in order to have a larger aperture. This is cumbersome.

SUMMARY

An aspect relates to provide an improved tower.

Embodiments of the invention propose a tower of a wind turbine, having a hollow inner space and a door for opening and closing an aperture into the inner space, which tower is characterised in that the door is a sliding door, which is slidingly arranged at a tower aperture member attached to the tower, and which sliding door is at least partially sealed by sealing means or seal to the tower aperture member at least when the door is in the closed position.

The inventive tower comprises a sliding door, which is slidingly arranged on a tower aperture member, which member comprises a large aperture, which can be opened and closed simply by sliding the door from a closed position to an open position and vice versa. The sliding door is guided on respective guiding means or guide, which allow a safe guidance of the door. The sliding door can have a quite large size, which is remarkably larger than the size of a regular hinged door, as it is sliding and not pivoted like the doors usually installed and which may have only the restricted size. As the sliding door slides, the wind pressure doesn't affect the opening and closing of the door allowing to enlarge the size of the door remarkably. This allows to provide an aperture with a maximum size, which is remarkably larger than the aperture of the door plate of known arrangements of the conventional art. Therefore, no cumbersome dismantling is necessary, when larger components need to be transported, as the sliding door can be opened to a maximum open position, in which the maximum aperture is available.

Furthermore a sealing means or seal is provided, which seals the door relative to the tower aperture member, when the door is in the closed position. The sealing means or seal provides at least a partial sealing, a complete sealing of the door relative to the tower aperture member, which complete sealing is advantageous to provide a sufficient air tightness, if requested. Furthermore, this sealing also provides protection against water entering the inner of the tower, for example when it rains heavily.

Beside the fact that the door and the tower aperture member may be flat and rectangular items, so that the sliding door, which is vertically arranged, slides in a horizontal movement, embodiments of the invention propose a tower, which has a curved outer surface, wherein the door is a curved door arranged at the curved tower aperture member. The tower aperture member and the door are adapted to the curved form of the tower respectively a tower segment, if the tower is built by several stacked separate segments. In this embodiment the door moves along a circular segmented path between its position, following the overall circular or curved tower surface.

One central member is the tower aperture member. This member, which is made of metal, like the door, is a rectangular frame member having two side plates, an upper plate and a lower plate, which plates delimit the aperture, whereby the sliding door is slidingly arranged at the upper and the lower member. The tower aperture member, which is a single member for an easy handling, is like a frame, to which the rectangular door is attached. As the door is horizontally movable, it is slidingly arranged respectively guided at the upper and lower plate, where respective upper and lower guide means or guide are arranged for guiding the door at its upper and its lower end. This upper and lower end guidance allows for a safe guidance of the door and for carrying also a heavy weight door, so that the size of the aperture and therefore the door can be remarkably enlarged compared to conventional art designs.

As the upper guide means or guide is concerned, this guide means or guide is realised by a roller guide. The door is guided by rollers on a guide rail arranged at the upper plate. This roller guide provides for a very soft and easy movement. The door hangs via the rollers on the guide rail. In addition to the rollers and the guide rail at the upper plate, the guidance at the lower door and is realised by one or more guide elements engaging a guide bar arranged at the lower plate. These guide elements are hooks engaging a groove provided in the guide bar. This simple hook engagement guide is simple but very effective.

It needs to be noted that the arrangement may also be vice versa, with the roller guide being provided at the lower door end and the element engaging guidance provided at the upper door end.

The upper guide means or guide and/or the lower guide means or guide are shielded by a shielding means or shield extending over it. This is a protection measure in order to cover the respective guide means or guide against dirt and to provide a good lubrication in the sliding or rolling guides.

In one embodiment the upper shielding means or shield which shields the upper guide mans is a shielding plate arranged at the tower aperture member, which shielding plate extends over the upper end of the door at least when the door is in the closed position. It is sufficient that the shielding plate extends over the upper door end, as the guide means or guide is arranged close to the upper door end, so that it can be safely covered by the shielding plate. The shielding plate has either a longitudinal or a curved form, depending on the overall form of the door arrangement (flat or curved).

In another embodiment the lower shielding means or shield is provided by the lower end portion of the door, which extends over the lower guide means or guide. Here the door itself provides for a good shielding, as it extends for a certain distance over the lower guide means or guide and covers it.

As mentioned, a sealing means or seal is provided for at least partially, completely sealing the door relative to the tower aperture member, at least when the door is in the closed position. This avoids an air pressure problem and provides a certain air tightness to a certain extent and keeps water out of the inner space. The sealing means or seal is provided in form of respective longitudinal gaskets, which seal the vertical edges and the horizontal edges of the sliding door to the tower aperture member at least when the sliding door is in the closed position. These gaskets are strip-like and may easily be fixed to the respective door arrangement part. They are either fixed to the tower aperture member and seal to the door, which is movable relative to the fixed gaskets and slides over them when it is moved. In an alternative the gaskets may also be fixed to the door and move with the door, they therefore slide along the tower aperture member. Which arrangement ever is taken, the gaskets provide a complete sealing, they therefore build a kind of sealing frame.

Also, at least a part of the sealing means or seal, especially the vertical gaskets, are shielded by a shielding means or shield at least when the sliding door is in the closed position. This shielding provides protection of the gaskets against dirt and sunlight, which improves the lifetime of the gaskets. Especially the vertical gaskets are shielded by respective shielding means or shield, as the horizontal gaskets, which are arranged close to the upper and lower guide means or guide, are covered by the door respectively the guide means or guide shielding.

One shielding means or shield for shielding a vertical gasket may be provided by an edge of the door itself, which edge is bent towards the tower aperture member, thereby extending over the neighbouring gasket at least in the closed position. So the door edge itself provides the shielding, as it covers the vertical gasket. On the other side another shielding means or shield is provided by a limit stop arranged at the tower aperture member, which stops the closing movement of the door, and which extends over the neighbouring gasket when the door is in the closed position. This limit stop has a double function. First it delimits the movement of the door and therefore defines the closed position. Second it provides the gasket shielding or protection. The limit stop is an elongated bar or the like, which covers the neighbouring gasket over its length in the closed position.

For not only limiting the movement in the closed position, embodiments of the invention further provide a limit stop which is arranged at the tower aperture member and which stops the opening movement of the sliding door. This limit stop may be a simple bolt or the like, as this limit stop has only the function to limit the movement but has no shielding function or the like.

Finally a locking mechanism may be provided for locking the sliding door in the closed position in order to avoid any inadmissible entrance into the inner of the tower. This locking mechanism may be of any kind which provides a safe door lock.

Furthermore, embodiments of the invention refer to a wind turbine comprising a tower as described above.

BRIEF DESCRIPTION

Some of the embodiments will be described in detail, with reference to the following figures, wherein like designations denote like members, wherein.

DETAILED DESCRIPTION

Figure 1:
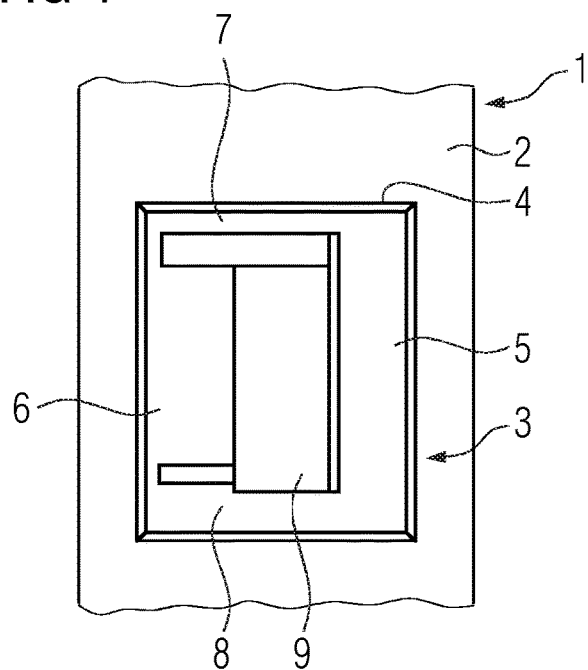
FIG. 1 shows a principal illustration of an inventive tower.

FIG. 1 shows a principal illustration of an inventive tower 1 of a wind turbine. The tower, which may be a one-piece tower or which may be built of several segments stacked above each other, comprises a curved outer surface 2, and a door arrangement 3. The door arrangement 3 comprises a tower aperture member 4 in the form of a rectangular frame member having two side plates 5, 6, and upper plate 7 and a lower plate 8, which tower aperture member 4 is either a one-piece metal member or segmented with separate plates. It is attached to the outer surface 2 of the tower 1 or embedded into the tower itself respectively the material, concrete, the tower is made of.

The door assembly 3 comprises a metal sliding door 9, which is arranged at the tower aperture member 4. It covers an aperture 10 provided in the tower aperture member 4, which aperture 10 is delimited by the respective plates 5, 6, 7, 8. This aperture 4 is covered by the sliding door 9, as shown in FIG. 2, which shows the sliding door 9 in the closed position, in which it obviously covers the aperture 10 completely.

Figure 2:
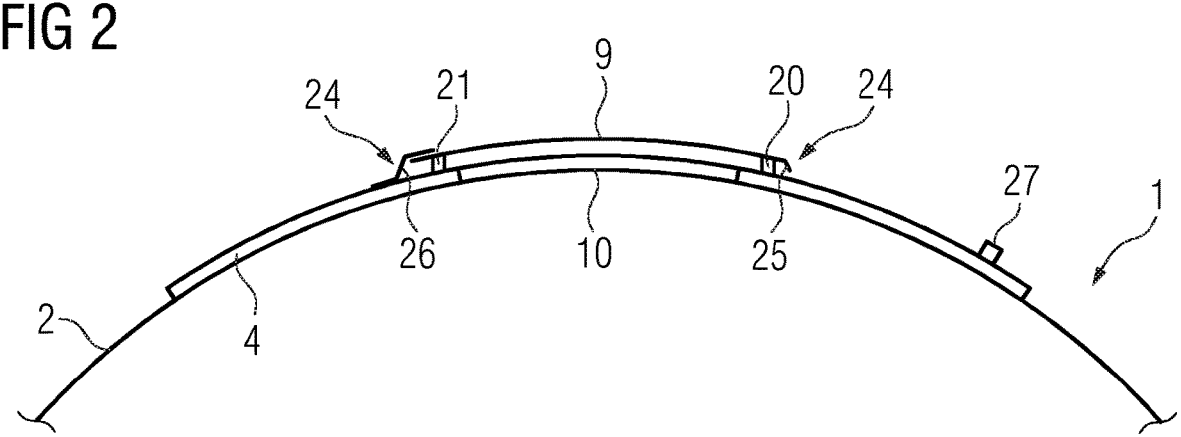
FIG. 2 shows a horizontal cross section of a part of the tower of FIG. 1.

As FIG. 2 shows, the tower aperture member 4 and the and the sliding door 9 are also curved, like the curved outer surface 2 of the tower 1. They therefore adopt the curvature respectively in form of the tower 1. Furthermore FIG. 2 shows a limit stop 27 limiting the opening movement of the sliding door 9.

Figure 3:
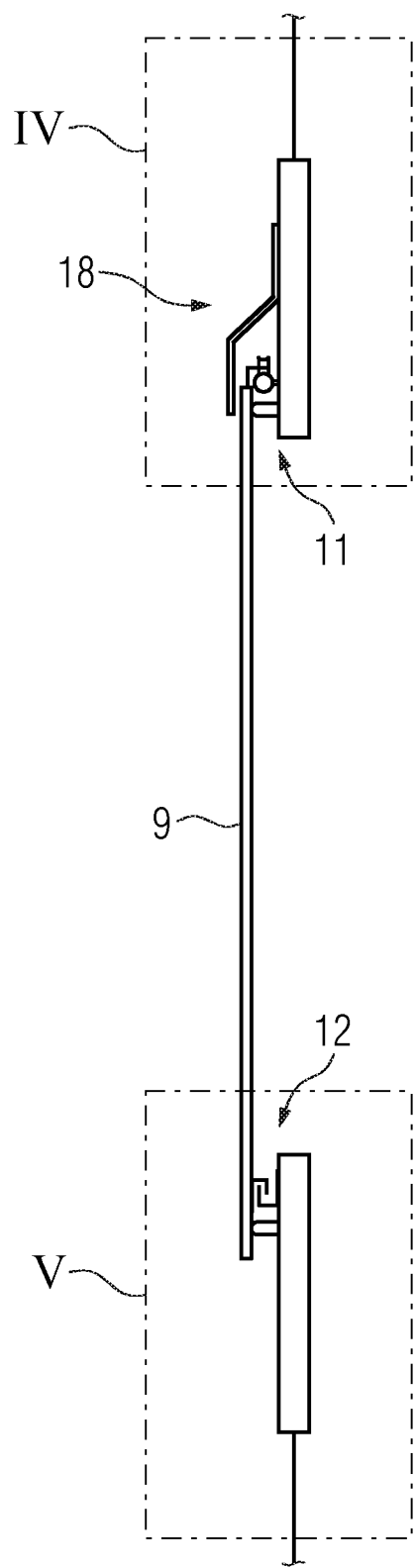
FIG. 3 shows a cross section of the door arrangement comprising the tower aperture member and the door.
Figure 4:
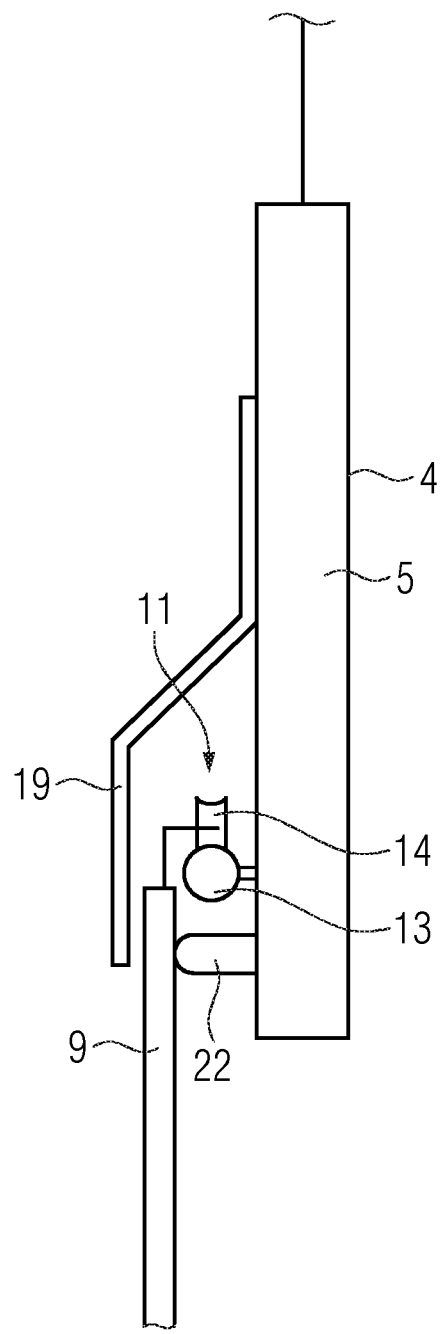
FIG. 4 shows an enlarged view of the section IV in FIG. 3.
Figure 5:
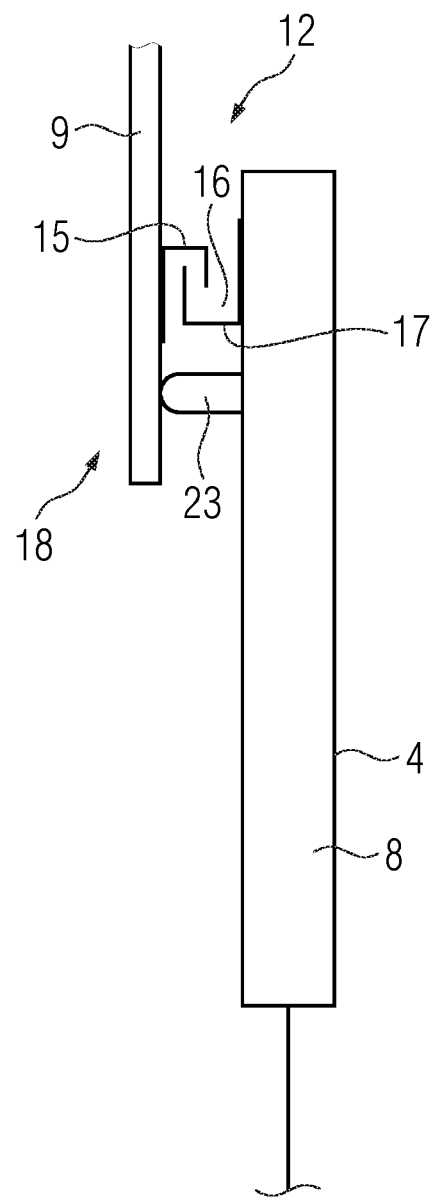
FIG. 5 shows an enlarged view of the section V in FIG. 3.

For carrying and guiding the sliding door 9 at the tower aperture member 4 upper and lower guide means or guide 11, 12 are provided, as depicted in FIG. 3 and shown in detail in FIGS. 4 and 5. The upper guide means or guide 11 comprises a guide rail 13 fixed to the tower aperture member 4 respectively the upper plate 5. The sliding door 9 is provided with several rollers 14, which are arranged at the upper end of the door 9 and which role on the guide rail 13. The door 9 hangs on the guide rail 13, a very stable attachment is realised, which is adapted to also carry a heavy door 9.

As the door 9 hangs on the upper guide means or guide 11 respectively the guide rail 13, the lower guide means or guide 12 can be simple. FIG. 5 shows an embodiment, where a hook-like guide element 15 respectively several of these hook-like guide elements 15 engaging a groove 16 of a guide bar 17 attached at the lower plate 8 of the tower aperture member 4, as shown in FIG. 5. This hook engagement is efficient for guiding the door 9 during the horizontal movement.

Furthermore, a shielding means or shield 18 in form of an elongated shielding plate 19 is attached to the upper plate 4. This shielding plate 19 covers the upper guide means or guide 11, as it extends over the roller guide and also a curtain distance over the upper end of the sliding door 9 covering or housing the complete upper guide means or guide 11.

Also, the lower guide means or guide 12 is covered by a shielding means or shield 18, which is realised by the lower end of the door 9 itself, as, see FIG. 5, it completely extends over the lower guide means or guide 12.

Furthermore, sealing means or seal are provided for sealing the sliding door 9 in the closed position, when it completely covers the aperture 10. The sealing means or seal comprises vertical gaskets 20, 21 as shown in FIG. 2, and horizontal gaskets 22, 23 as shown in FIGS. 4 and 5. All gaskets 20, 21, 22, 23 are arranged at the tower aperture member 4, so that the door 9 is moved relative to them and slides over them. At least in the closed position the gaskets 20, 21, 22, 23 completely seal the sliding door 9 to the tower aperture member 4. They build a kind of rectangular sealing frame which completely seals the door 9 along its edges towards the tower aperture member 4, so that a certain air-tight sealing is provided.

The gasket 20 is shielded by a shielding means or shield 24 provided by the edge 25 of the sliding door 9, which is obviously bent towards the tower aperture member 4. In the closed position this bent edge 25 is adjacent to the gasket 20.

The gasket 21 on the other side is also protected by a shielding means or shield 24, which is realised by a bar-like limit stop 26, which limits the sliding movement of the door 9 in the closed position according to FIG. 2. The edge of the sliding door 9 runs against the limit stops 26, which in this position overlaps the gasket 21 and therefore protects it. The shielding means or shield 24 protect the gaskets against dirt and especially sunlight, so that the life term of the gaskets 20, 21 is extended.

Also, the gaskets 22 and 23 are somehow protected, as they are covered by the sliding door 9 itself, when the door 9 is in the closed position, as shown in FIGS. 4 and 5. The sliding door 9 extends respectively overlaps with the gaskets 22, 23, as clearly shown, protecting them in the closed position. It needs to be mentioned, that the sliding door 9 is in the closed position most of the time, it is only opened when needed.

The sliding door arrangement 3 according to embodiments of the invention provides access to the inner of the tower 1 through a large aperture, which can be made remarkably larger than apertures in the conventional art. As the door 9 is a sliding door, which hangs on the upper guide means or guide 11 realised by the roller guidance, the door maybe quite large and therefore quite heavy, and may be adapted to cover even very large apertures. The integration of the gaskets, which are in this embodiment fixed to the tower aperture member 4, allows for a good and almost air-tight sealing of the door 9 to the tower aperture member 4, and for keeping water out of the tower 1. Due to the shielding means or shield 24 the gaskets 20, 21, 22, 23 are protected against sunlight and dirt, avoiding enhanced wear and prolonging their lifetime. As also the upper and lower guide means or guide 11, 12 are protected by the respective shielding means or shield 18, also the guide means or guide 11, 12 are protected against dirt and wear, only usual maintenance work is necessary.

Especially when the tower 1 respectively the wind turbine is installed off-shore, the sealed door arrangement 3 provides seawater from entering the inner of the tower 1, which seawater is corrosive and may not enter the inner.

As the door is a sliding door 9, the movement of the door for opening and closing it is not sensitive to wind pressure, as the door is horizontally moved but not pivoted. High wind pressure is especially given at tower respectively turbine installations close to the shore or at off-shore installations, which high wind pressures sometimes do not allow to open or close the door.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A tower of a wind turbine, having a hollow inner space and a door for opening and closing an aperture into the inner space, wherein the door is a sliding door positioned outside the tower, wherein the sliding door is slidingly arranged at a tower aperture member attached to the tower, wherein the sliding door is at least partially sealed by a seal to the tower aperture member at least when the door is in the closed position, wherein the sliding door is guided at its upper and its lower end at a respective upper and lower guide arranged at the tower aperture member, and wherein the upper guide and/or the lower guide are shielded by a shield extending over it.

2. The tower according to claim 1, wherein the tower has a curved outer surface and the tower aperture member is a curved tower aperture member, wherein and that the sliding door is a curved sliding door arranged at the curved tower aperture member.

3. The tower according to claim 1, wherein the tower aperture member is a rectangular frame member having two side plates, an upper plate and a lower plate delimiting the aperture, whereby wherein the sliding door is slidingly arranged at the upper and the lower plate.

4. The tower according to claim 3, wherein the sliding door is guided by rollers on a guide rail arranged at the upper plate and by one or more guide elements engaging a guide bar arranged at the lower plate, or vice versa.

5. The tower according to claim 4, wherein the guide elements are hooks engaging a groove provided in the guide bar.

6. The tower according to claim 1, wherein an upper shield of the shield is a shielding plate arranged at the tower aperture member, which extends over the upper end of the door at least when the sliding door is in the closed position.

7. The tower according to claim 1, wherein a lower shield of the shield is provided by the lower end portion of the door, which extends over the lower guide.

8. The tower according to claim 1, wherein another seal in form of respective longitudinal gaskets are provided, which seal vertical edges and horizontal edges of the sliding door to the tower aperture member at least when the sliding door is in the closed position.

9. The tower according to claim 8, wherein the gaskets are fixed to the tower aperture member with the sliding door moving relative to them, or that the gaskets are fixed to the sliding door and move with it.

10. The tower according to claim 1, wherein at least a part of the seal, are shielded by a shield at least when the sliding door is in the closed position.

11. The tower according to claim 10, wherein a first shield is provided by an edge of the sliding door, which edge is bent towards the tower aperture member, thereby extending over a first neighbouring gasket at least when the sliding door is in the closed position and wherein a second shield is provided by a limit stop arranged at the tower aperture member, which stops a closing movement of the sliding door and which extends over a second neighbouring gasket when the sliding door is in the closed position.

12. The tower according to claim 1, wherein a limit stop is arranged at the tower aperture member, which stops an opening movement of the sliding door.

13. A wind turbine, comprising the tower according to claim 1.

14. A tower of a wind turbine, having a hollow inner space and a door for opening and closing an aperture into the inner space, wherein the door is a sliding door positioned outside the tower, wherein the sliding door is slidingly arranged at a tower aperture member attached to the tower, wherein the sliding door is at least partially sealed by a seal to the tower aperture member at least when the door is in the closed position, wherein at least a part of the seal is shielded at least when the sliding door is in the closed position, wherein a first shield is provided by an edge of the sliding door, which edge is bent towards the tower aperture member, thereby extending over a first neighbouring gasket at least when the sliding door is in the closed position, and wherein a second shield is provided by a limit stop arranged at the tower aperture member, which stops a closing movement of the sliding door and which extends over a second neighbouring gasket when the sliding door is in the closed position.

\* \* \* \* \*